US004001790B2

United States Statutory Invention Registration [19]

[11] Reg. Number: H1790

Coleman

[45] Published: Mar. 2, 1999

[54] MEDIC-CAM

[75] Inventor: Mark A. Coleman, Landsdowne, Md.

[73] Assignee: The United States of America as represented by the Secretary of the Army, Washington, D.C.

[21] Appl. No.: 759,823

[22] Filed: Nov. 21, 1996

[51] Int. Cl.[6] ..... H04N 13/00

[52] U.S. Cl. ..... 348/14

[58] Field of Search ..... 348/14–20, 53, 348/114–117; 345/7–9; 340/980; 379/430

[56] References Cited

U.S. PATENT DOCUMENTS

| | | | |
|---|---|---|---|
| 5,005,213 | 4/1991 | Hanson et al. | 348/115 |
| 5,162,828 | 11/1992 | Furness et al. | 353/122 |
| 5,671,158 | 9/1997 | Fournier et al. | 345/8 |
| 5,696,521 | 12/1997 | Robinson et al. | 348/53 |

FOREIGN PATENT DOCUMENTS

| | | | |
|---|---|---|---|
| 06-141308 | 5/1994 | Japan | 379/430 |

*Primary Examiner*—Daniel T. Pihulic
*Attorney, Agent, or Firm*—Paul S. Clohan

[57] ABSTRACT

The Medic-Cam is a wireless, highly integrated, portable, lightweight system which provides high quality video and audio communications between highly trained specialists and remotely located field personnel. The system utilizes a head mounted display, a subminiature high resolution color CCD camera, microphone, transmitter, receiver, antenna, battery and vest. The size and integration of the head mounted components allow it to be worn under a combat kevlar helmet.

10 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MEDIC-CAM

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

Many scenarios can be envisioned where it would be desirable for a person of limited knowledge to communicate with a person having extensive knowledge. For example, an army medic has limited knowledge regarding the treatment of wounded soldiers, while an army doctor is an expert in this type of treatment. It is impractical to train all army medics to the extent that army doctors are trained, yet it would be of great benefit to wounded soldiers if all army medics had the ability to communicate in real time with army doctors at field hospitals regarding the wounds they are treating. If army medics had the ability to transmit video images of the wounds they are treating back to army doctors, and to discuss the treatment of these wounds via two way radio, then the treatment of the wounded soldier would be greatly enhanced. However, army medics must operate in hostile environments, and cannot be encumbered by bulky equipment, no matter how desirable the equipment might be. Therefore, this type of equipment must be small, lightweight, robust, and compatible with existing army combat equipment. The medic must be able to perform his combat medical tasks unhindered by any extra equipment, while the army doctor, located miles away, must be able to view clearly what the medic is doing. Bulky cameras, transmitters, receivers, and display devices are not suitable in this type of environment. However, recent technology in the miniaturization of components now makes the integration of this type of equipment possible.

BRIEF SUMMARY OF THE INVENTION

It is therefore an object of the present invention to assist army field medics who are required to treat patients beyond their training and knowledge by providing a doctor a video resource as he mentors the medic through procedures.

A further object of the present invention is to provide a device for remote tele-maintenance.

A still further object is to provide a device for use in hazardous situations, such as security and law enforcement, hazardous material handling, explosive handling, and fire-fighting.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by a Medic-Cam system having a control module which contains the transmitter, camera video processor, head mounted display processor, and microphone signal conditioner. The control module is compact, lightweight, and mounts on the users vest or belt. The head mounted display, camera and microphone are integrated into a single lightweight and easily worn package with a cable connecting it to the control module. The system can then be configured to operate in different modes depending on the mission. One mode is simplex wideband video with an audio subcarrier from the user to the base with separate narrowband audio from the base to the user. Another mode is full duplex wideband video and audio between the user and base. In this mode the user switches the image viewed on the head mounted display between the camera image and a mentor's image. A third mode is simplex wideband video from the user to the base with separate full duplex narrowband audio. These different modes allow for multiple users on a net with separate audio channels, group audio, full audio net, single or bidirectional video. The modes also allow for partial system power-up for battery conservation while maintaining audio communications. Numerous types of receivers can be connected to the control module through a single connector. The control module provides signal conditioning and power for the receiver. The system is also capable of relaying data via a second subcarrier. The external data sources may a vital signs monitor, patient digital ID tag, a GPS receiver, or other status monitor.

DETAILED DESCRIPTION OF THE INVENTION

Figure 1:
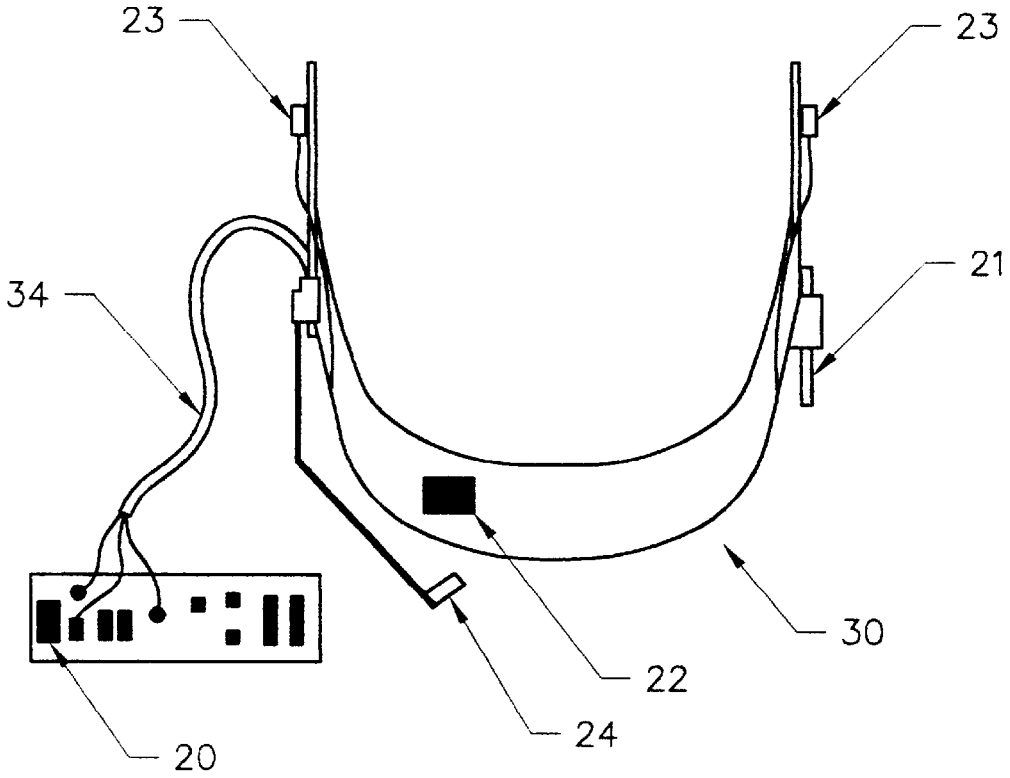
FIG. 1 is a top view of the Medic-Cam system in use.
Figure 2:
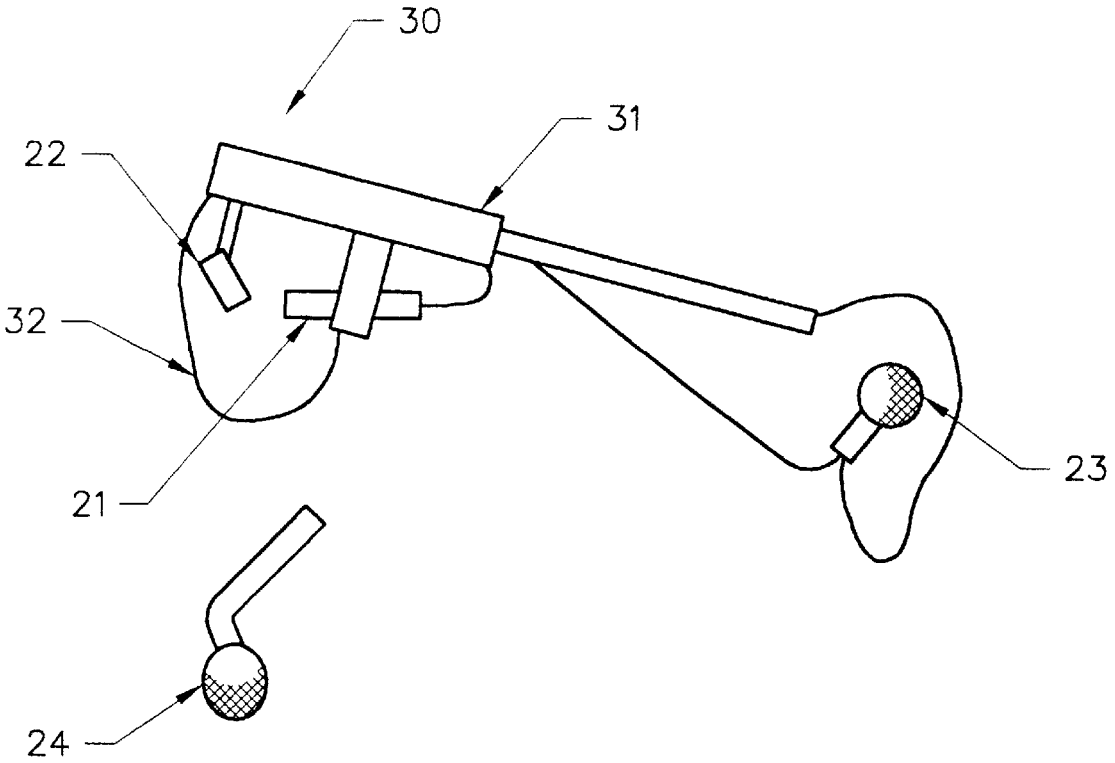
FIG. 2 is a side view of a user fitted with the Medic-Cam system.
Figure 3:
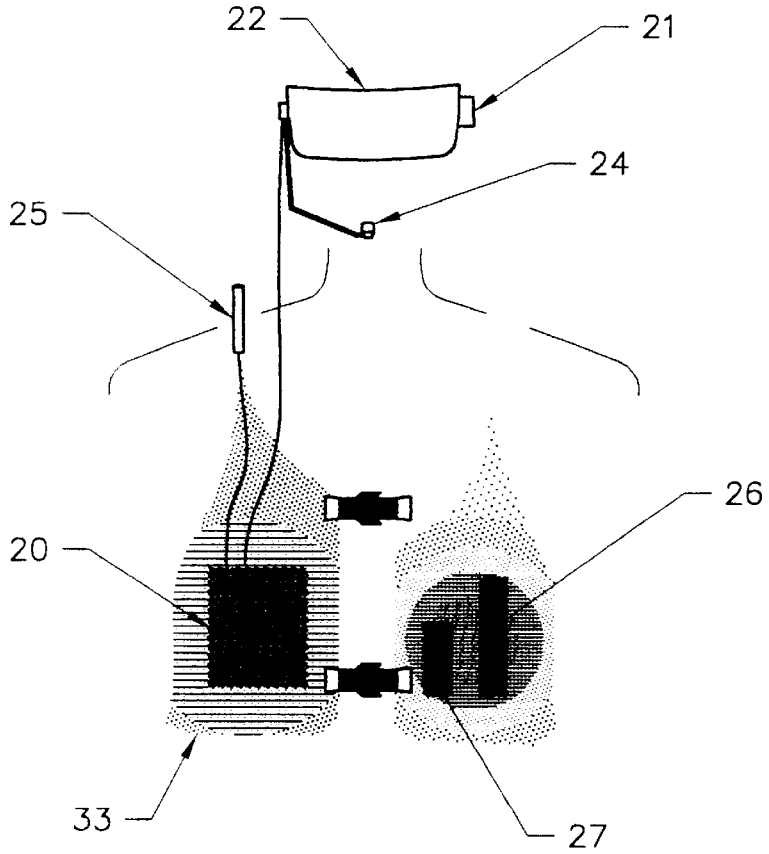
FIG. 3 is a front view of the Medic-Cam system in use.

The Medic-Cam system as worn by a user is illustrated in the accompanying FIGS. 1, 2, and 3. Item 20 is the integrated system control module which contains all of the necessary controls for operation of the system, is mounted to vest 33, and is connected to head mounted display system 30 by cable 34. A suitable head mounted display system 30 (less microphone 24 and camera 21) is described in U.S. Pat. No. 5,162,828, which is hereby incorporated by reference. Item 21 is a standard sub-miniature high resolution color CCD video camera attached to frame 31 of head mounted display system 30. Item 22 represents the display from video camera 21, is mounted on transparency (goggles) 32, and is more fully described in U.S. Pat. No. 5,162,828. The user wears earphones 23, and communicates to his base station by boom microphone 24 attached to frame 31. Item 25 represents the antenna for the transmitter contained within system control module 20 and item 27 represents the receiver. The system is powered by battery 26 on vest 33.

Figure 4:
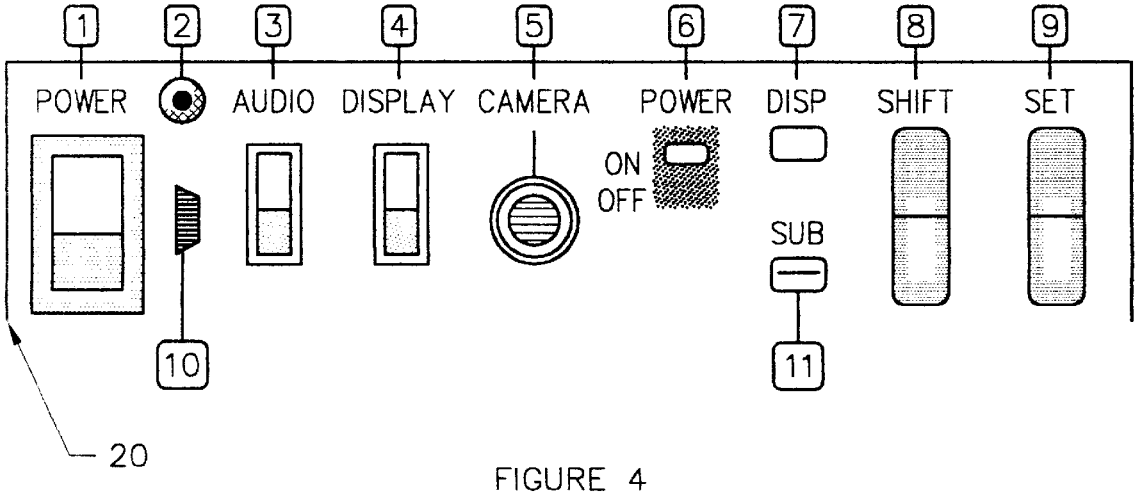
FIG. 4 is a front view of the system control module of the Medic-Cam system.

The integrated system control module 20, shown in detail in FIG. 4, contains the transmitter, camera video processor, head mounted display processor, and microphone signal conditioner, all of which are individually available commercially. Control module 20 is compact, lightweight, and mounts on the users vest or belt. Control module 20 contains a power switch 1 for turning on the power to the head mounted display, transmitter, audio and receiver. Connector 2 is for microphone 24, connector 5 is for camera 21, and connector 10 is for head mounted display 22 and earphones 23. Switch 3 controls volume to earphones 23, switch 4 controls brightness on display 22, switch 6 is the power switch for camera 21, switch 7 is a camera menu option display switch, switch 8 is a camera menu option select switch, switch 9 is a camera menu option modify switch, and switch 11 is a camera menu option sub-menu switch.

Figure 5:
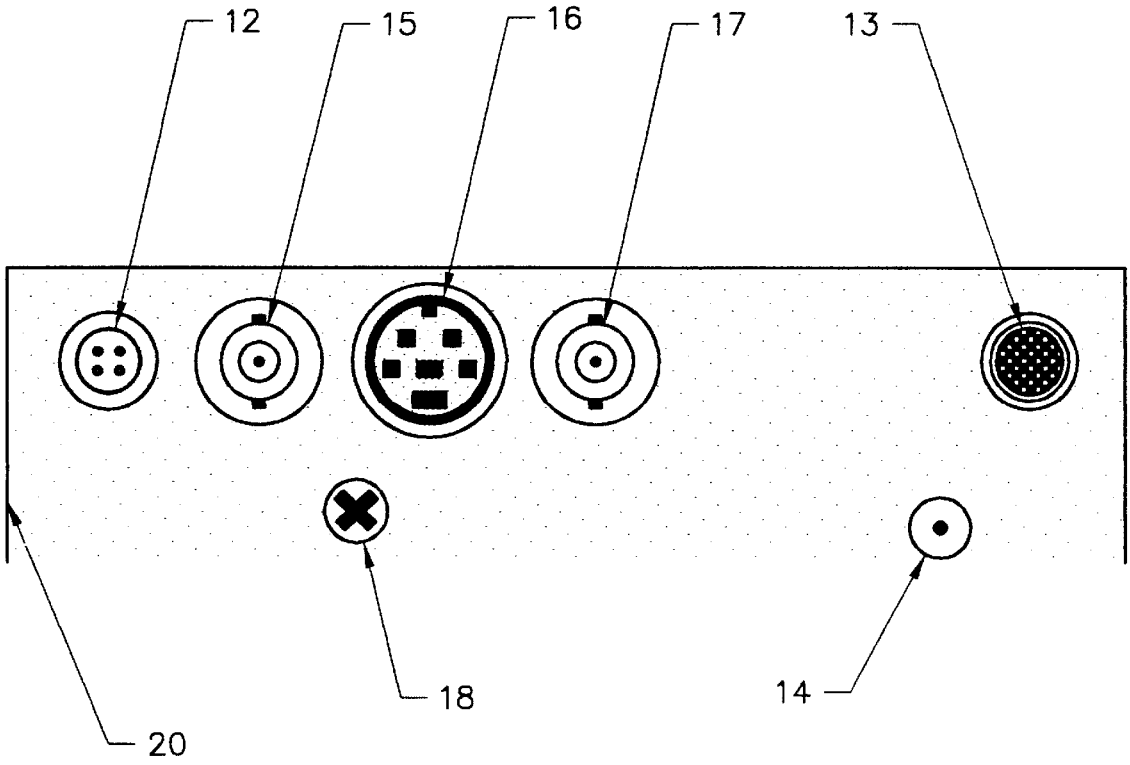
FIG. 5 is a rear view of the system control module of the Medic-Cam system.

On the rear panel of module 20, shown in FIG. 5, is connector 12 for power input from battery 26, connector 13 for receiver 27, connector 14 for antenna 25, connector 15 for external sync, connector 16 for s-video, connector 17 for video, and adjustment screw 18 for s.c. fine.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A wireless, highly integrated, portable, lightweight system which provides high quality video and audio communications between highly trained specialists and remotely located personnel comprising:

a head mounted display system for viewing video images including a frame and a transparency;

a set of earphones to be worn by said specialists;

a boom microphone mounted to said head mounted display system;

a sub-miniature camera mounted to said head mounted display system;

transmitter & receiver means;

antenna means;

a source of power; and a control module to control said lightweight system.

2. The device of claim 1 wherein said head mounted display system includes a light transmissive display mounted on the frame of the eyewear and optics for collimating light to project an image of displayed information at a distance from the user in the periphery of the field of view defined by the transparency of the eyewear.

3. The device of claim 2 wherein the optics includes a single mirror that receives the information directly from the display.

4. The device of claim 3 wherein the mirror is toroidal so as to project an enlarged image at an apparent optical distance from the user that is greater than the actual optical path.

5. The device of claim 3 wherein said mirror is planar with a collimating lens to project the image at a desired distance from the user.

6. The device of claim 3 wherein said mirror if fully reflective.

7. The device of claim 3 wherein said mirror is partially reflective.

8. The device of claim 4 wherein said transmitter & receiver means is located within said control module.

9. The device of claim 8 further comprising a vest for mounting said control module, said source of power, and said antenna.

10. The device of claim 9 wherein said source of power comprises a battery.

* * * * *